United States Patent
Wendeberg et al.

(10) Patent No.: US 9,243,664 B2
(45) Date of Patent: Jan. 26, 2016

(54) TOROIDAL ROLLER BEARING

(71) Applicant: AKTIEBOLAGET SKF, Göteborg (SE)

(72) Inventors: Hans Wendeberg, Västra Frölunda (SE); Linus Efraimsson, Askim (SE)

(73) Assignee: AKTIEBOLAGET SKF, Gothenburg (SE)

( * ) Notice: Subject to any disclaimer, the term of this patent is extended or adjusted under 35 U.S.C. 154(b) by 0 days.

(21) Appl. No.: 14/396,654

(22) PCT Filed: Apr. 17, 2013

(86) PCT No.: PCT/SE2013/000054
§ 371 (c)(1),
(2) Date: Oct. 23, 2014

(87) PCT Pub. No.: WO2013/162437
PCT Pub. Date: Oct. 31, 2013

(65) Prior Publication Data
US 2015/0098671 A1     Apr. 9, 2015

(30) Foreign Application Priority Data
Apr. 23, 2012 (SE) ......................... 1200242

(51) Int. Cl.
*F16C 23/08* (2006.01)
*F16C 33/36* (2006.01)
*F16C 33/58* (2006.01)
*F16C 33/46* (2006.01)
*F16C 19/22* (2006.01)
*F16C 19/26* (2006.01)

(52) U.S. Cl.
CPC ............. *F16C 33/4605* (2013.01); *F16C 19/22* (2013.01); *F16C 19/26* (2013.01); *F16C 23/086* (2013.01); *F16C 33/586* (2013.01); *F16C 2202/02* (2013.01)

(58) Field of Classification Search
CPC ........ F16C 23/06; F16C 23/08; F16C 23/082; F16C 23/084; F16C 23/086; F16C 23/088
USPC .......................................... 384/558, 564, 568
See application file for complete search history.

(56) References Cited

U.S. PATENT DOCUMENTS 4,705,411 A * 11/1987 Kellstrom ...................... 384/450
2011/0064348 A1 *  3/2011 Jacob et al. .................... 384/568

FOREIGN PATENT DOCUMENTS

| DE | 102009042941 A1 | 3/2011 |
| EP | 0175858 A1 | 4/1986 |
| EP | 0520968 A1 | 12/1992 |
| WO | 2007065402 A1 | 6/2007 |

* cited by examiner

*Primary Examiner* — Phillip A Johnson
(74) *Attorney, Agent, or Firm* — Bryan Peckjian; SKF USA Inc. Patent Dept.

(57) ABSTRACT

A toroidal roller bearing, which comprises an outer ring, an inner ring and a plurality of roller elements interposed between the outer and inner rings, wherein the toroidal roller bearing allows for angular and axial displacement between the outer ring and the inner ring. The bearing includes a cage for holding the roller elements, wherein the cage provides an axial guiding feature for axially guiding the roller elements against at least one of the outer ring, inner ring and a separate element located outside the toroidal roller bearing.

10 Claims, 2 Drawing Sheets

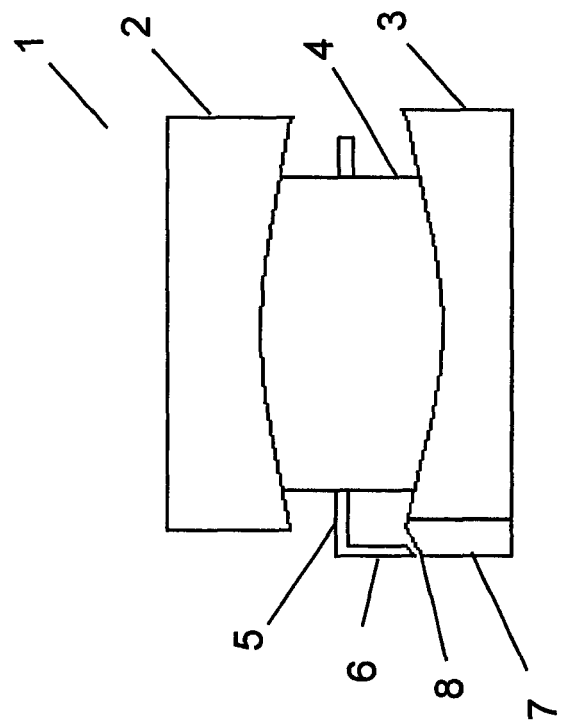
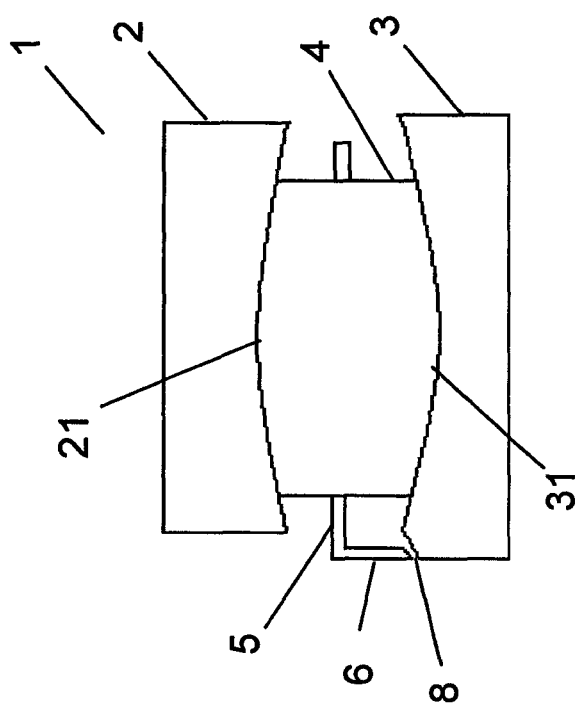
Fig. 1
Fig. 2

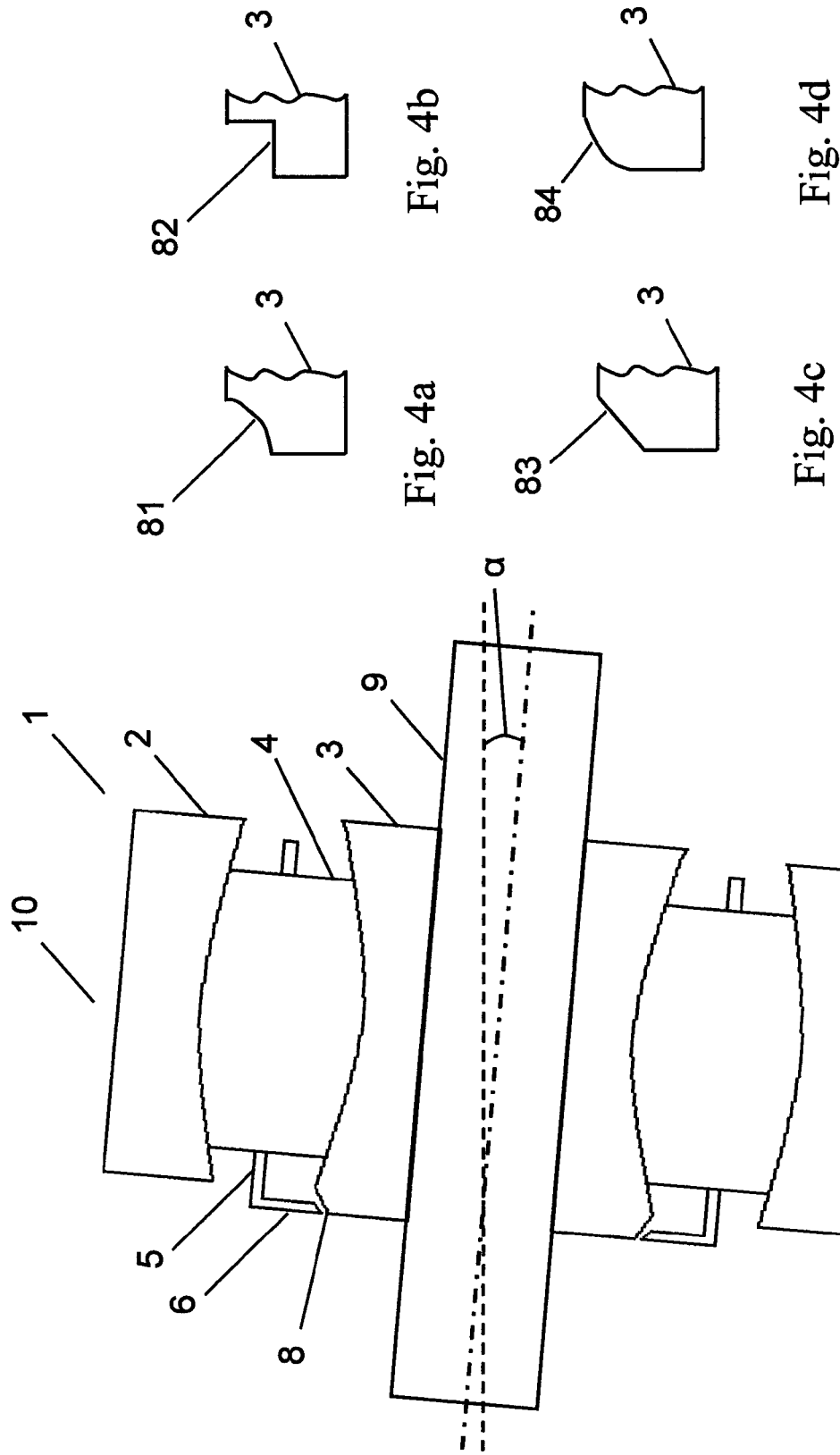

TOROIDAL ROLLER BEARING

CROSS REFERENCE TO RELATED APPLICATIONS

This is a National Stage application claiming the benefit of International Application Number PCT/SE2013/000054, filed on 17 Apr. 2013 (Apr. 17, 2013), which claims priority to Sweden Patent Application 1200242-4, filed on 24 Apr. 2012 (Apr. 24, 2012), both of which are is incorporated herein by reference in their entireties.

FIELD OF THE INVENTION

The invention relates to a toroidal roller bearing. Toroidal roller bearings are known for its ability to allow both axial and angular displacement of its bearing rings.

According to a first aspect, the invention regards a toroidal roller bearing.

According to a second aspect, the invention regards a bearing arrangement comprising a toroidal roller bearing and a shaft onto which the bearing is mounted.

BACKGROUND OF THE INVENTION

Toroidal roller bearings are known and have been used for many years due to its ability to allow for both axial and angular relative displacement between its bearing rings (outer ring and inner ring). The function and general design of a toroidal roller bearing is for instance described in EP 0175858. The function of the bearing is enabled by the curved construction of the inner and outer rings' raceways which are adapted to conform with the curved shape of the roller elements. Hence, toroidal roller bearings combine self-aligning capability with considerable axial displacement ability.

Due to its capabilities, toroidal roller bearings provide a wide range of applicability in various bearing arrangement designs. In particular the toroidal roller bearings simplify designs comprising e.g. a long shaft that may be subject to temperature variations and bending. Furthermore, the construction of the toroidal roller bearing allows for suitable load distributions as well as low frictional running.

Some concerns when using a toroidal roller bearing have been discovered by the inventors that may arise in different applications. These concerns have been shown to be caused by e.g. the cage in the bearing. Roller elements in the bearing which are in an unloaded zone may be affected by the cage in a negative way. The rollers, when in an unloaded zone, may for instance be braked by the cage, which will lead to roller slip. Roller slip is something that should be avoided because the lubrication film that is needed between the roller elements and the bearing's raceways is disturbed or even vanished when the slip becomes too large. This may lead to a reduction in the service life. Another effect that may arise for the rollers in its unloaded zone is roller skew, caused by e.g. the cage, which may lead to increased friction in the bearing, increased unwanted forces on the cage or increased wear of the bearing components. Yet another effect that may arise for the rollers in its unloaded zone is that the rollers are moved in its axial direction. This may lead to noise and damages on the surfaces of the rollers and the raceways.

SUMMARY OF THE INVENTION

An object of the invention is to overcome at least one of the problems of the prior art.

According to the first aspect, this object has been achieved by providing a new toroidal roller bearing design. The toroidal roller bearing comprises an outer ring, an inner ring, a plurality of roller elements interposed between the outer and inner ring, wherein the toroidal roller bearing allows for angular and axial displacement between said outer and inner ring. Moreover, the bearing comprises a cage for holding and separating the roller elements, wherein the cage presents means for axially guiding the roller elements against at least one of the outer ring, inner ring or a separate element located outside the toroidal roller bearing.

Due to this design, the rollers will be axially guided and keep the rollers in position in their loaded and unloaded zone during operation of the bearing. It has been found by the inventors that when size and thus the weight of the roller elements is large, it is especially advantageous to guide the roller elements axially by the cage against one of the bearing rings. Especially if the bearing is mounted on a non-horizontal shaft or in circumstances when the roller elements are exposed of axial forces there has been found to be a need for guiding the roller elements in a way keeping them in position both when being in a loaded and unloaded condition. In an alternative embodiment, a separate element, such as a ring, may be used as a corresponding guiding element for the cage. The ring may for instance be positioned axially outside the bearing.

In this document, the words axial and radial are used. If not stated differently for any of the presented embodiments of the invention, it refers to the geometry of the toroidal roller bearing and the cage. Axial means a direction following an imaginary line that intersect the center points of the cage and the roller bearing and that is perpendicular to a radial direction of the bearing and the cage. Radial means a radial direction of the bearing and the cage that origin from the center points of the bearing and the cage.

In an embodiment of the toroidal roller bearing, the means is at least one portion on the cage extending in a radial direction towards at least one of the outer ring, inner ring or the separate element. The portion may also be extending along a part of the circumference of the cage. In an alternative embodiment, the portion extends along the whole circumference of the cage. There may also be several radially extending portions located around the circumference of the cage.

In an embodiment of the toroidal roller bearing, at least one of the outer ring, inner ring or separate element presents at least one surface extending in a circumferential direction of the outer ring, inner ring or separate element, wherein the surface is meant to be able to receive the means to thereby axially guide the roller elements. In the case when the means is at least a radially extending portion, the portion is configured to be able to be in contact with the surface so that the cage can axially guide the roller elements.

In an embodiment of the toroidal roller bearing, the at least one surface is located on at least one axial end of the inner and/or outer ring. Further, the portion may be located at an axial end of the cage and thus be located in a corresponding location so that the portion and the surface are able to contact each other.

In an embodiment of the toroidal roller bearing, the at least one surface in its axial extension is inclined, stepped, concave or convex. An inclined or similarly shaped surface will result in that the surface may be able to create a resisting force in an axial direction against another element that is in contact with the surface. The axially resisting force will act against the means, such as a portion on the cage, so that the roller elements will be guided axially by the cage. The surface may have any other shape that is able to create a resisting axial force in any axial direction.

In an embodiment, the surface presents a shape that is suitable for building up an efficient lubrication film between the surface and the portion of the cage. For instance, if the surface is a stepped surface, a lubrication film between the portion of the cage and the surface may be improved. This will result in a reduced friction coefficient between the surface and the part of the portion that is meant to be in contact with the surface. Other examples of surfaces that could be suitable for building up an improved lubrication film are a roughened surface, a surface presenting dimples etc.

In an embodiment of the toroidal roller bearing, the surface has a friction coefficient below 0.20 to allow a smooth sliding contact between the means and the surface. The surface may obtain a low friction coefficient by e.g. providing a smooth surface roughness on a steel surface or by providing a low-friction coating on the surface.

The toroidal bearing of the invention may be used in many different applications, such as in a wind turbine, a paper mill, in steel making industry, in marine applications such as pod propulsion systems etc.

According to the second aspect, the object is achieved by a bearing arrangement, comprising, a toroidal roller bearing according to any of the embodiments of the first aspect, a shaft, and wherein the bearing is mounted on the shaft. Furthermore, the shaft during operation is meant to oscillate in its axial direction, or the shaft is positioned in an angle α being (90−y) degrees, wherein y is between 0 and 89, or the rolling elements during operation are exposed of an axial force F.

All embodiments of the first aspect are applicable to all embodiments of the second aspect and vice versa.

The new toroidal bearing will be especially advantageous when an axial force is acting on the roller elements. An axial force will for instance act against the roller elements if the bearing is mounted onto a non-horizontal shaft.

BRIEF DESCRIPTION OF DRAWINGS

Below, a more detailed description of a number of preferred embodiments will be described. It should be noted that the accompanying drawings are not drawn to scale, and in some cases specific details may have been exaggerated in order to better explain the invention. Furthermore, the invention as claimed is not limited to the embodiments described and shown, but modifications are possible for a skilled person within the scope of the claims.

FIG. 1 is a cross sectional view of a toroidal roller bearing according to the invention.

FIG. 2 is a cross sectional view of another toroidal roller bearing according to the invention.

FIG. 3 is a cross sectional view of a bearing arrangement according to the invention.

FIG. 4a-d show cross sectional views of parts of an inner ring according to the invention.

DETAILED DESCRIPTION OF THE PRESENT INVENTION

In FIG. 1, an axial cross section of a toroidal roller bearing 1 according to the invention is disclosed. The cross section is a cross section of a plane, wherein the axial line of the bearing 1 is in the plane. The toroidal roller bearing 1 comprises an outer ring 2, an inner ring 3, a plurality of roller elements 4 and a cage 5. The toroidal roller bearing 1 allows for axial and angular displacement of the outer ring 2 relative the inner ring 3. This is possible due to the configuration of the rings 2, 3 and the roller elements 4. The inner ring 3 and the outer ring 2 present concave raceways 31 and 21 respectively, and the roller elements 4 present corresponding convex shapes. The curve radii of the raceways 21, 31 and the roller elements 4 are substantially greater than the greatest distance between the central axes and the surfaces 21 and 31 of the raceways. The cage 5 has a number of roller pockets (not shown) where the rollers 4 are located in order to separate the rollers 4 from each other. Furthermore, the cage 5 presents means 6 for axially guiding the roller elements 4 against the inner ring 2. The axial guidance may also be performed against the outer ring 2 or against a separate element 7 as is shown in FIG. 2. In this embodiment, the means 6 is a portion 6 on the cage 5. The portion 6 extends in a radial direction against a surface 8 on the inner ring. The surface 8 in this embodiment is inclined. If and when an axial force is acting on any of the roller elements from the left side of the bearing 1 in FIG. 1, the portion 6 will finally come in contact with the inclined surface 8 and thereby axially guide the roller elements 4. If there were no portion 6 on the bearing 1 and if there were an axial force acting on the bearing 1, the roller elements 4 would move in the direction of the force, and finally the function of the bearing 1 will be reduced, for instance leading to braking forces in the bearing 1 that will lead to increased rolling friction. In this embodiment, there is one portion 6 located on one side of the bearing 1 and directed against a surface 8 of the inner ring 3. There may of course be other portions 6 too, for instance directed against the outer ring 2 and/or located on the other axial side of the bearing 1. In this illustration, the portion 6 is located in an axial position outside the outer ring 2. It shall be recognized that the portion 6 in another embodiment may be positioned axially inside the axial width of the outer ring 3. Further, the surface 8 may have other shapes. When there is an inclined shape of the surface 8, the surface 8 will be able to take up axial forces in one direction. However, the surface 8 may have a shape that is able to take up axial forces in both directions, such as for instance a groove on one of the bearing rings, where the portion 6 is partly located in the groove so that axial forces in both directions can be taken care of.

FIG. 2 shows a cross sectional view of another embodiment of the invention. A toroidal roller bearing 1 is disclosed that comprises an outer ring 2, an inner ring 3, a plurality of roller elements 4 and a cage 5. The cross section is a cross section of a plane, wherein the axial line of the bearing 1 is in the plane. Furthermore, the cage presents means 6 for axially guiding the roller elements against a separate element 7, which in turn presents an inclined surface 8 onto which the means 6, such as a portion 6 of the cage 5, can be in contact. The separate element 7 in this embodiment is located on one of the axial sides of the inner ring 3, but the element 7 may be located in other places or there may be more than one separate element 7 located for instance on the other axial side of the inner ring 3 or on any of the axial sides of the outer ring 2. Further, the surface 8 may have any shape that will lead to that an axial force in any or both directions can be taken care of. In this illustration, the portion 6 is located in an axial position outside the outer ring 2. It shall be recognized that the portion 6 in another embodiment may be positioned axially inside the axial width of the outer ring 3.

FIG. 3 shows a cross sectional view of a bearing arrangement 10 according to the invention. The cross section is a cross section of a plane, wherein the axial line of the bearing 1 is in the plane. The bearing arrangement 10 presents a toroidal roller bearing 1 which comprises an outer ring 2, an inner ring 3, a plurality of roller elements 4 and a cage 5. Further, the arrangement comprises a shaft 9, wherein the bearing 1 is mounted onto the shaft by the inner ring 3 of the bearing 1. The shaft in this embodiment is positioned in a non-horizontal angle α which will result in an axial force component acting on the roller elements 4. The cage 5 presents a portion 6 extending in a radial direction of the bearing 1 and the inner ring 3 presents an inclined surface 8. The portion 6 will axially guide the roller elements 4 via the surface 8 when the axial force is acting on the roller elements 4 due to the angle α of the shaft 9. The force acting on the roller elements needs to be of a magnitude such that the roller elements 4 are displaced axially relative the rings 2 and 3 in order for the portion and the surface 8 to contact each other.

FIG. 4a-d show cross sectional views of embodiments of a surface 8. In this example, the surface 8 is located on an inner ring 3 of a toroidal roller bearing. FIG. 4a shows an example of a concave surface 8. FIG. 4b shows an example of a stepped surface 8. The stepped surface 8 may present more than one step. FIG. 4c shows an example of an inclined surface and FIG. 4d shows an example of a convex surface.

The invention claimed is:

1. A toroidal roller bearing, comprising,
   an outer ring;
   an inner ring;
   a plurality of roller elements interposed between the outer and inner rings, wherein the toroidal roller bearing allows for angular and axial displacement between said outer and inner ring; and
   a cage for holding and separating the roller elements,
   wherein, when viewing an axial cross-section of the toroidal roller bearing, the cage has a first axial part and a second axial part with one of the plurality of roller elements therebetween, at least one of the first axial part and the second axial part of the cage comprises an axial guiding feature extending radially therefrom for axially guiding the roller elements against at least one of the outer ring, the inner ring and a separate element located outside the toroidal roller bearing, wherein a radial end of the axial guiding feature is configured to contact the at least one of the outer ring, the inner ring, and the separate element only when the plurality of roller elements are subjected to an axial force in a direction away from the axial guiding feature, and wherein the axial guiding feature has an axial length less than an axial length of the at least one of the first axial part and the second axial part of the cage.

2. The toroidal roller bearing according to claim 1, wherein the axial guiding feature is at least one portion on the cage extending in a radial direction towards at least one of the outer ring, the inner ring and the separate element.

3. The toroidal roller bearing according to claim 1, wherein at least one of the outer ring, the inner ring and the separate element presents at least one surface extending in a circumferential direction of at least one of the outer ring, the inner ring and the separate element, wherein the surface is adapted to receive the axial guiding feature to thereby axially guide the roller elements.

4. The toroidal roller bearing according to claim 3, wherein the at least one surface is located on at least one axial end of at least one of the inner ring and the outer ring.

5. The toroidal roller bearing according to claim 3, wherein the at least one surface in its axial extension is:
   inclined,
   stepped,
   concave, or
   convex.

6. The toroidal roller bearing according to claim 3, wherein the at least one surface has a friction coefficient below 0.20.

7. The toroidal roller bearing according to claim 1, wherein the radial end of the axial guiding feature that is configured to contact the at least one of the outer ring, the inner ring, and the separate element, is tapered.

8. The toroidal roller bearing according to claim 1, wherein when the axial guiding feature is not contacting the one of the outer ring, the inner ring, and the separate element, the axial guiding feature is located in an axial position outside one of the inner ring and the outer ring such that the axial guiding feature does not have an axial position that is equal to any point on the one of the inner ring and the outer ring.

9. A toroidal roller bearing, comprising,
   an outer ring;
   an inner ring;
   a plurality of roller elements interposed between the outer and inner rings, wherein the toroidal roller bearing allows for angular and axial displacement between said outer and inner ring; and
   a cage for holding and separating the roller elements,
   wherein the cage comprises an axial guiding feature for axially guiding the roller elements against a separate element located outside the toroidal roller bearin, wherein the separate element is a ring.

10. A bearing arrangement, comprising,
    a toroidal roller bearing comprising:
       an outer ring,
       an inner ring,
       a plurality of roller elements interposed between the outer and inner rings,
       wherein the toroidal roller bearing allows for angular and axial displacement between said outer and inner ring, and
       a cage for holding and separating the roller elements,
       wherein, when viewing an axial cross-section of the toroidal roller bearing, the cage has a first axial part and a second axial part with one of the plurality of roller elements therebetween, at least one of the first axial part and the second axial part of the cage comprises an axial guiding feature extending radially therefrom for axially guiding the roller elements against at least one of the outer ring, the inner ring and a separate element located outside the toroidal roller bearing, wherein a radial end of the axial guiding feature is configured to contact the at least one of the outer ring, the inner ring, and the separate element only when the plurality of roller elements are subjected to an axial force in a direction away from the axial guiding feature, and wherein the axial guiding feature has an axial length less than an axial length of the at least one of the first axial part and the second axial part of the cage;
    a shaft, wherein the toroidal roller bearing is mounted on the shaft (9), and one of:
       wherein the shaft (9) during operation is meant to oscillate in its axial direction, or
       wherein the shaft (9) is positioned in an angle α being (90−y) degrees, wherein y is between 0 and 89, or
       wherein the rolling elements during operation are exposed to an axial force F.

* * * * *